(12) United States Patent
Tsai

(10) Patent No.: US 7,365,915 B2
(45) Date of Patent: Apr. 29, 2008

(54) OPTICAL MODULE

(75) Inventor: Kun-Jung Tsai, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,553

(22) Filed: Aug. 21, 2006

(65) Prior Publication Data

US 2007/0101796 A1    May 10, 2007

(30) Foreign Application Priority Data

Nov. 4, 2005  (CN) .......................... 2005 1 0101024

(51) Int. Cl.
*G02B 15/14* (2006.01)
(52) U.S. Cl. ...................................... 359/704; 359/700
(58) Field of Classification Search ........ 359/700–714, 359/819–823
See application file for complete search history.

(56) References Cited

U.S. PATENT DOCUMENTS

| 7,262,925 B2 * | 8/2007 | Huang .......................... 359/796 |
| 2004/0135916 A1 * | 7/2004 | Makii .......................... 348/335 |

* cited by examiner

*Primary Examiner*—M. Hasan
(74) *Attorney, Agent, or Firm*—Jeffrey T. Knapp

(57) ABSTRACT

An exemplary optical module (100) includes a lens barrel (20), a lens group (40), a spacer (60), and a filter (80). The lens barrel has an inner wall (201), and at least two securing grooves (206) formed on the inner wall. The lens group and the spacer are disposed in the lens barrel. The spacer includes an annular base (601) and a predetermined amount of projecting blocks (603) formed on a same side of the base (601). At least two first bending portions (604) are formed on the blocks bending toward a center of the base, and at least two second bending portions (606) are formed on the blocks bending outwards from a center of the base. The second bending portions are configured to be secured in the securing grooves of the lens barrel. The filter is secured on the spacer by the first bending portions.

17 Claims, 4 Drawing Sheets

OPTICAL MODULE

DESCRIPTION

1. Field of the Invention

The present invention generally relates to optical modules used in photography and imaging equipment and, more particularly, to an optical module for a digital camera.

2. Description of Related Art

Currently, digital camera modules are included as a special feature in a wide variety of portable electronic devices and, of course, in stand-alone digital camera units. Most portable electronic devices are becoming progressively more miniaturized over time, and digital camera modules are correspondingly becoming smaller and smaller. Nevertheless, in spite of the small size of a contemporary digital camera module, consumers still demand excellent imaging.

An optical module used for a digital camera module typically includes a barrel, a lens group, a spacer, and a filter. The lens group and the spacer are received in the barrel. The filter is fixedly mounted in the barrel by using, for example, an adhesive, thereby preventing the lens group and the filter from falling out of the barrel. When the adhesive used to adhere the filter to the barrel is dilute, it can seep into the lens group via capillary action, thus impairing imaging quality of the optical module.

Therefore, a new optical module is desired in order to overcome the above-described shortcomings.

SUMMARY OF THE INVENTION

In one embodiment thereof, an optical module includes a lens barrel, a lens group, a spacer, and a filter. The lens barrel has an inner wall, and at least two securing grooves being formed on the inner wall. The lens group is disposed in the lens barrel. The spacer is disposed in the lens barrel. The spacer includes an annular base and a predetermined amount of projecting blocks formed on a same side of the base. At least two first bending portions are formed on the blocks bending towards a center of the base, and at least two second bending portions are formed on the blocks bending out from the center of the base. The second bending portions are configured (i.e. structured and arranged) to be elastically secured in the securing grooves of the lens barrel. The filter is secured on the spacer by the first bending portions.

Other advantages and novel features of the embodiments will become more apparent from the following detailed description thereof when taken in conjunction with the accompanying drawings.

BRIEF DESCRIPTION OF THE DRAWINGS

Many aspects of the present optical module can be better understood with reference to the following drawings. The components in the drawings are not necessarily drawn to scale, the emphasis instead being placed upon clearly illustrating the principles of the optical module and its potential applications. Moreover, in the drawings, like reference numerals designate corresponding parts throughout the several views.

DETAILED DESCRIPTION OF THE INVENTION

Figure 1:
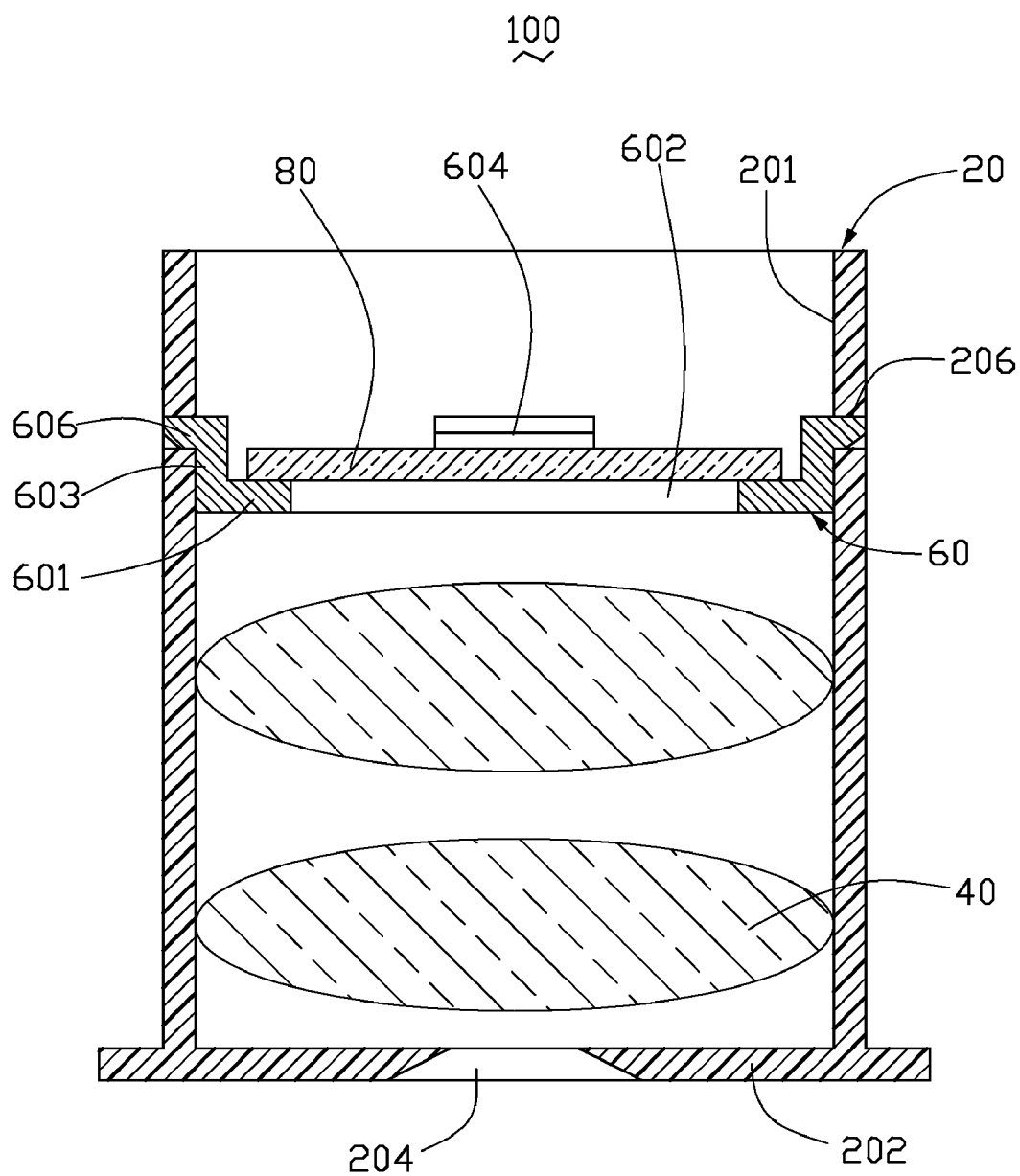
FIG. 1 is a cross-sectional, schematic view of an optical module in accordance with a preferred embodiment.
Figure 2:
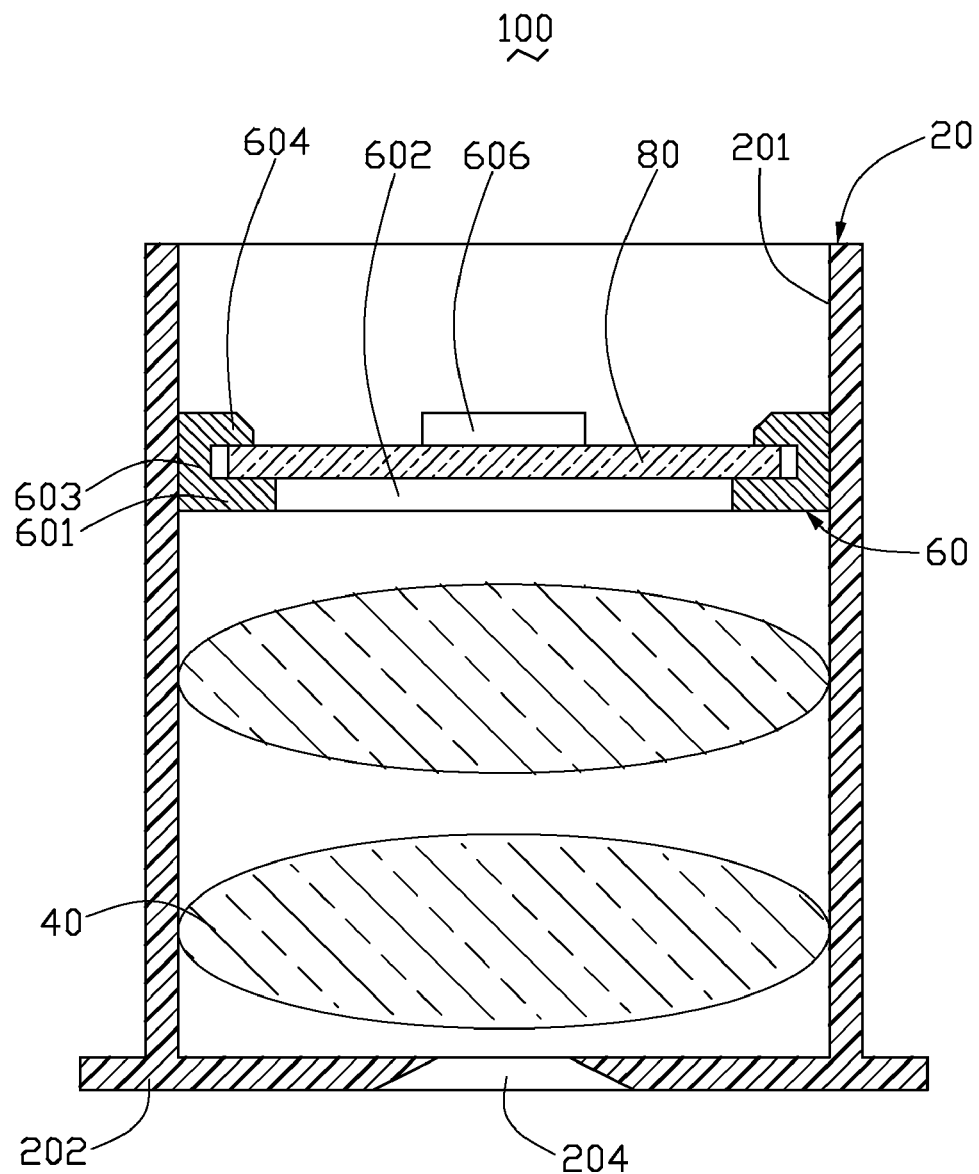
FIG. 2 is similar to FIG. 1, showing the optical module from a different perspective.

Referring to FIGS. 1 and 2, an optical module 100 according to a first embodiment of the present optical module includes a lens barrel 20, a lens group 40, a spacer 60, and a filter 80. The lens group 40, the spacer 60, and the filter 80 are engagingly received in the lens barrel 20. In this embodiment, the optical module 100 is used in a digital camera. The digital camera can be adapted for use in a portable electronic device such as a mobile phone or a personal digital assistant (PDA), but the compact nature thereof could prove useful in compact digital camera units or digital camcorders, as well. It should be noted that the optical module 100 may also, for example, be used with other optical systems, such as digital video cameras, image pick-up systems used in cars, infrared optical systems, projection optical systems, and real-time detector systems.

The lens barrel 20 is a substantially hollow cylinder, having an inner wall 201, a partially-closed cover 202 and an open end on the opposite end to the partially-closed cover 202. A transparent portion 204 is formed on a center of the cover 202 for allowing light to pass through. Two securing grooves 206 are formed on the inner wall 201 at the opposite end to the cover 202.

The lens group 40 includes at least one lens. In the illustrated embodiment, the lens module 40 includes two lenses. It is to be understood that lenses of any number and type could be used in the lens group 40. The lens group 40 is disposed in the lens barrel 20 adjacent to the cover 202.

Figure 3:
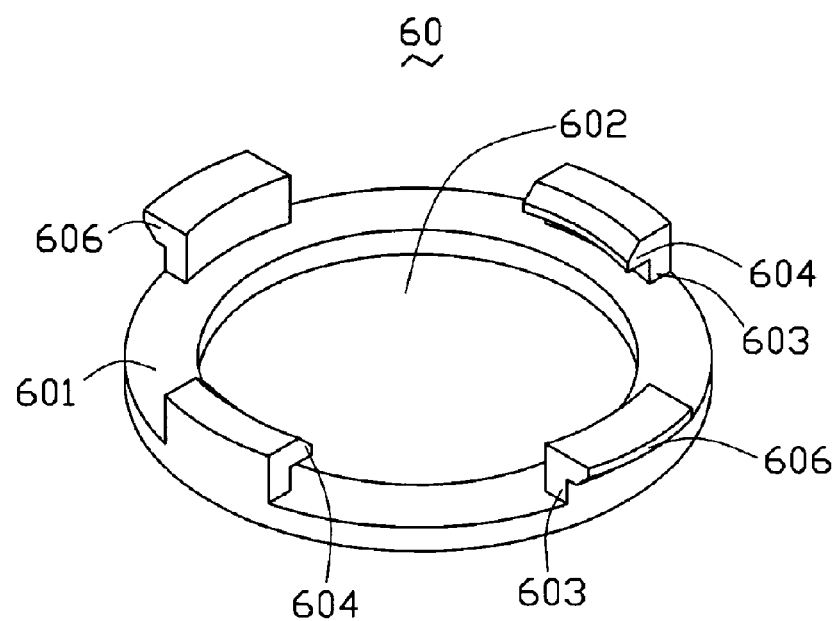
FIG. 3 is a schematic view of the spacer in FIG. 1.

Referring also to FIG. 3, the spacer 60 is substantially ring-shaped. The spacer 60 includes an annular base 601, a light-passing opening 602, and four projecting blocks 603 evenly formed on a same side of the base 601. The base 601 has a substantially same diameter to an inner diameter of the lens barrel 20. The light-passing opening 602 is formed on a center of the base 601. Two first bending portions 604 are formed on two opposite blocks 603 toward the center of the base 601, and two second bending portions 606 are formed on the other two blocks 603 outward the center of the base 601. The second bending portions 606 are configured to be elastically secured in the securing grooves 206 of the lens barrel 20. In this embodiment, the bending portions 604, 606 are made of an elastic material, such as a rubber or an elastic plastic.

Figure 4:
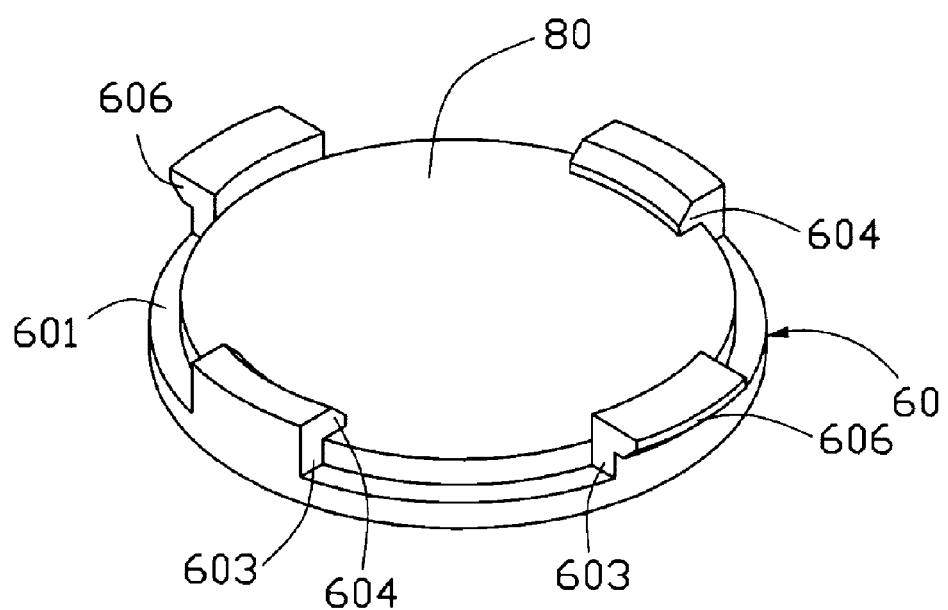
FIG. 4 is a schematic view of the spacer with the filter secured thereon.

Referring also to FIG. 4, the filter 80 is substantially disk-shaped. The filter 80 is used to selectively transmit light having certain properties, while blocking the remainder. The filter 80 can be selected, for example, from a group consisting of infrared-cut filters and low pass filters. The filter 80 has a diameter slightly bigger than that of the light-passing opening 602, thus the filter 80 can be engagingly secured on the base 601 by the first bending portions 604.

In assembly of the optical module 100, firstly, the filter 80 is secured on the base 601 by the first bending portions 604. Secondly, the lens group 40 is received in the lens barrel 20. Thirdly, the spacer 60 with the filter 80 is pressed into the lens barrel 20 until the second bending portions 606 are secured in the securing grooves 206. The optical module 100 is thus completely assembled.

It is to be understood, the spacer 60 can include two projecting blocks 603, where each block has a first bending portion 604 and a second bending portion 606. The number of the projecting blocks 603 can also be more than two, so as to steadily receive or secure the filter 80.

Because the filter 80 is secured in the lens barrel 20 using the spacer 60 without adhesive, the lens group 40 can avoid being polluted by adhesive. Thus, the optical module 100 can obtain an excellent imaging quality.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical module, comprising:
   a lens barrel having an inner wall, and at least two securing grooves being formed on the inner wall;
   a lens group disposed in the lens barrel;
   a spacer disposed in the lens barrel, the spacer including a base and a predetermined amount of projecting blocks formed on a same side of the base, at least two first bending portions being formed on the blocks bending towards a center of the base, at least two second bending portions being formed on the blocks bending out the center of the base, and the second bending portions being secured in the securing grooves of the lens barrel; and
   a filter engagingly secured on the spacer by the first bending portions.

2. The optical module as claimed in claim 1, wherein the spacer includes four projecting blocks evenly formed on the annular base.

3. The optical module as claimed in claim 2, wherein the first bending portions are respectively formed on two opposite projecting blocks, and the second bending portions are respectively formed the other opposite projecting blocks.

4. The optical module as claimed in claim 1, wherein the spacer includes two projecting blocks, and each blocks has one of the at least two first bending portion and one of the at least two second bending portion.

5. The optical module as claimed in claim 1, wherein the lens barrel is cylindrical in shape, and a partially closed cover is formed on one side of the lens barrel.

6. The optical module as claimed in claim 5, wherein a transparent portion is formed on a center of the cover.

7. The optical module as claimed in claim 5, wherein the lens group is secured in the lens barrel adjacent to the cover.

8. The optical module as claimed in claim 1, wherein an opening is formed on a center of the spacer.

9. The optical module as claimed in claim 8, wherein the filter has a larger diameter than that of the opening.

10. The optical module as claimed in claim 1, wherein the filter is an infrared-cut filter.

11. The optical module as claimed in claim 1, wherein the base is annular in shape.

12. The optical module as claimed in claim 1, wherein the second bending portions are elastically secured in the securing grooves of the lens barrel.

13. A spacer for securing a filter in a lens barrel of an optical module, comprising:
    an annular base; and
    a predetermined amount of projecting blocks formed on a same side of the base,
    at least two first bending portions formed on the blocks bending toward a center of the base, at least two second bending portions being formed on the blocks bending outward from the center of the base, the first bending portions being configured for securing the filter thereon, and the second bending portions being configured to be elastically secured in the lens barrel.

14. The spacer as claimed in claim 13, wherein the spacer includes four projecting blocks evenly formed on the annular base.

15. The spacer as claimed in claim 14, wherein the first bending portions are respectively formed on two opposing projecting blocks, and the second bending portions are respectively formed on the other opposing projecting blocks.

16. The spacer as claimed in claim 13, wherein the spacer includes two projecting blocks, and each blocks has a first bending portion and a second bending portion.

17. The spacer as claimed in claim 13, wherein the filter is an infrared-cut filter.

* * * * *